US012389270B2

(12) United States Patent
Nakazato et al.

(10) Patent No.: US 12,389,270 B2
(45) Date of Patent: Aug. 12, 2025

(54) MANAGEMENT APPARATUS, MANAGEMENT METHOD, AND MANAGEMENT PROGRAM

(71) Applicant: RAKUTEN MOBILE, INC., Tokyo (JP)

(72) Inventors: Jin Nakazato, Tokyo (JP); Saki Tanaka, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/802,570

(22) PCT Filed: Nov. 26, 2021

(86) PCT No.: PCT/JP2021/043440
§ 371 (c)(1),
(2) Date: Aug. 26, 2022

(87) PCT Pub. No.: WO2023/095298
PCT Pub. Date: Jun. 1, 2023

(65) Prior Publication Data
US 2024/0196270 A1  Jun. 13, 2024

(51) Int. Cl.
*H04W 28/08* (2023.01)
*H04W 24/02* (2009.01)

(52) U.S. Cl.
CPC .......... *H04W 28/08* (2013.01); *H04W 24/02* (2013.01)

(58) Field of Classification Search
CPC ...... H04W 28/08; H04W 24/02; H04W 88/08
See application file for complete search history.

(56) References Cited

U.S. PATENT DOCUMENTS

| 8,656,406 B2* | 2/2014 | Nakayama | H04L 67/1029 718/105 |
| 9,253,159 B2* | 2/2016 | Chauhan | H04L 67/141 |
| 11,979,420 B2* | 5/2024 | Se | G06N 3/0464 |
| 2012/0281708 A1* | 11/2012 | Chauhan | H04L 67/141 370/401 |
| 2014/0101306 A1* | 4/2014 | Murgia | H04L 47/125 709/224 |

(Continued)

FOREIGN PATENT DOCUMENTS

| JP | 2019-062510 A | 4/2019 |
| WO | WO-2019177087 A1 * | 9/2019 |

OTHER PUBLICATIONS

International Search Report for PCT/JP2021/043440 dated, Mar. 1, 2022 (PCT/ISA/210).

*Primary Examiner* — Jael M Ulysse
(74) *Attorney, Agent, or Firm* — Sughrue Mion, PLLC

(57) ABSTRACT

A management apparatus in a radio access network including RUs (Radio Units) and vDUs (virtual Distributed Units), the management apparatus comprising: a monitoring unit configured to acquire load states of the respective vDUs; and a control unit configured to determine, among the vDUs, based on the load states that have been acquired, a first vDU in which a load should be lowered and a second vDU for receiving part of the load from the first vDU, to determine, among RUs connected to the first vDU, an RU for which a connection destination is to be changed to the second vDU, and to change the connection destination of the determined RU from the first vDU to the second vDU.

15 Claims, 9 Drawing Sheets

(56) References Cited

U.S. PATENT DOCUMENTS

| | | |
|---|---|---|
| 2015/0181605 A1 | 6/2015 | Kurihara |
| 2017/0310437 A1 | 10/2017 | Bottari et al. |
| 2019/0208575 A1* | 7/2019 | Barbieri ............ H04W 72/0446 |
| 2020/0084682 A1* | 3/2020 | Wang .............. H04W 36/00835 |
| 2021/0385689 A1* | 12/2021 | Mehta ................... H04W 24/02 |
| 2022/0353163 A1* | 11/2022 | Ramamurthi ........ H04B 17/309 |
| 2024/0422566 A1* | 12/2024 | Tsuda .................... H04W 16/16 |

\* cited by examiner

MANAGEMENT APPARATUS, MANAGEMENT METHOD, AND MANAGEMENT PROGRAM

CROSS REFERENCE TO RELATED APPLICATIONS

This application is a National Stage of International Application No. PCT/JP2021/043440 filed Nov. 26, 2021.

TECHNICAL FIELD

The present invention relates to a management apparatus, a management method, and a management program for a radio access network.

BACKGROUND

In 5th-generation mobile communication systems (5G: 5th-Generation mobile communication systems), high-speed, high-capacity mobile communication (eMBB: enhanced Mobile Broadband) is made possible by making use of wider frequency bandwidths at higher carrier frequencies.

Various services making use of high-speed communication have begun to become more common, and further development is expected in the future. However, while the demand for high-speed, high-capacity communication such as that required for high-quality moving images and virtual reality/augmented reality is increasing, low-speed communication and low-capacity communication for snap-shot photographs, text, and the like are still popular. Compared with the radio resources and physical resources required in radio access network base stations for high-speed, high-capacity communication, less resources are required for low-speed communication and low-capacity communication. Under such circumstances, resource allocation taking into account complicated demand elements in which multiple use cases are intermixed has become necessary.

Patent Document 1 does not describe features such as selecting base station elements (RUs) to be regrouped in order to allow used resources to be leveled for base stations (DUs) that are strained.

What is done in Patent Document 2 is to scale out strained base stations (DUs) to connect base station elements (RUs), rather than to level the used resources.

CITATION LIST

Patent Literature

Patent Document 1: US 2017/0310437 A1
Patent Document 2: US 2015/0181605 A1

SUMMARY OF INVENTION

Technical Problem

The present invention was made in view of the above, and an objective of the invention is to provide a technology for leveling used resources by reconfiguring between base stations based on the load states of DUs (Distributed Units) in the base stations.

More specifically, the present invention provides a management apparatus, a management method, and a management program for a radio access network, wherein the load states of resources allocated to base stations are acquired, and the RUs (Radio Units) of a certain base station (first base station) are reconfigured with respect to a second base station based on the load states, thereby allowing the resources to be used efficiently as a network system overall.

Solution to Problem

One embodiment of the management apparatus according to the present invention is a management apparatus in a radio access network including RUs (Radio Units) and vDUs (virtual Distributed Units), the management apparatus comprising: a monitoring unit configured to acquire load states of the respective vDUs; and a control unit configured to determine, among the vDUs, based on the load states that have been acquired, a first vDU in which a load should be lowered and a second vDU for receiving part of the load from the first vDU, to determine, among RUs connected to the first vDU, an RU for which a connection destination is to be changed to the second vDU, and to change the connection destination of the determined RU from the first vDU to the second vDU.

The load states of the respective vDUs may relate to radio resources or to physical resources.

The radio access network may further include a vCU (virtual Centralized Unit) that periodically acquires the load states of the respective vDUs, and the monitoring unit may be configured to periodically acquire the load states of the respective vDUs from the vCU.

The monitoring unit may be configured to periodically acquire the load states from the respective vDUs.

The control unit may be configured to determine, as the first vDU, the vDU with the highest load state among the vDUs.

The control unit may be configured to determine, as the second vDU, the vDU with the lowest load state among the vDUs on servers different from the first vDU and located in the same subscriber exchange station as the first vDU.

The control unit may be configured to determine, as the RU for which the connection destination is to be changed to the second vDU, the RU with the highest load among the respective RUs connected to the first vDU and for which the connection destination can be changed to the second vDU.

The control unit may be configured to select the RU with the highest load among the RUs connected to the first vDU and for which the connection destination can be changed to the vDU with the lowest load state among respective subscriber exchange stations in the radio access network, and to determine, as the second vDU, the vDU with the lowest load state that can be a connection destination for the selected RU.

The control unit may be configured to determine, as the RU for which the connection destination is to be changed to the second vDU, the RU with the highest load among the RUs connected to the first vDU and for which the connection destination can be changed to the vDU with the lowest load state among respective subscriber exchange stations in the radio access network.

The vDU with the lowest load state among respective subscriber exchange stations may be selected in the order of the subscriber exchange stations closer to the subscriber exchange station containing the first vDU based on at least position information of the multiple subscriber exchange stations.

Whether or not the connection destination of the RU can be changed may be based on at least whether or not the load of the RU can be added to resources already allocated to the vDU that is the change destination.

One embodiment of the management method according to the present invention is a management method to be performed by a management apparatus in a radio access network including RUs (Radio Units) and vDUs (virtual Distributed Units), wherein the management method comprises: acquiring load states of the respective vDUs; determining, among the vDUs, based on the load states that have been acquired, a first vDU in which a load should be lowered and a second vDU for receiving part of the load from the first vDU; determining, among RUs connected to the first vDU, an RU for which a connection destination is to be changed to the second vDU; and changing the connection destination of the determined RU from the first vDU to the second vDU.

One embodiment of the management program according to the present invention is a management program for making the management apparatus execute the management method in the above-mentioned radio access network.

Effects of Invention

According to the respective embodiments of the present invention, used resources can be leveled by reconfiguring between base stations based on the load states of DUs in the base stations.

DESCRIPTION OF EMBODIMENTS

Hereinafter, embodiments of the present invention will be explained in detail with reference to the drawings.

Figure 1:
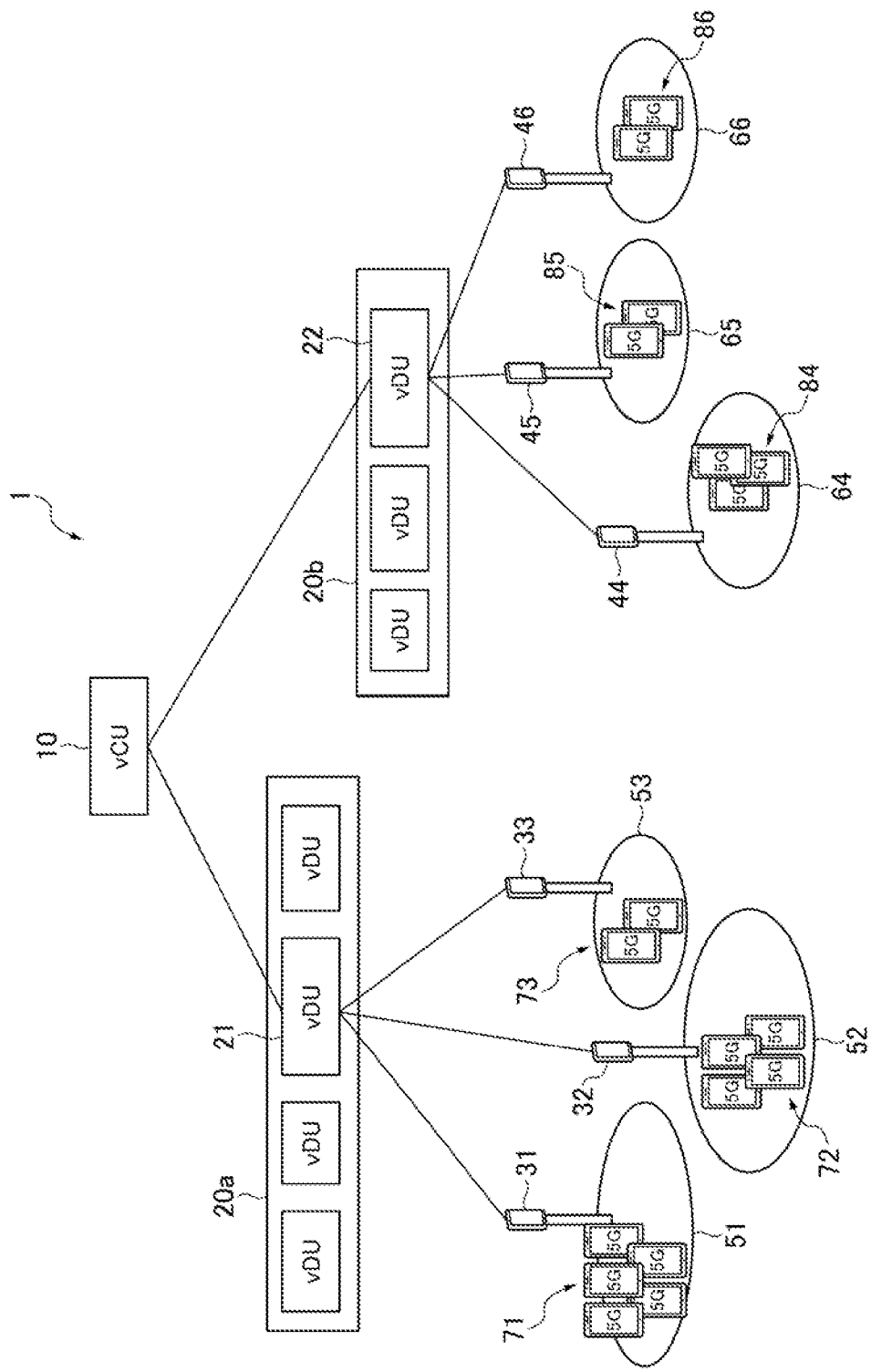
FIG. 1 illustrates an example of a radio access network to which the management apparatus and the management method according to an embodiment of the present invention is applied.

FIG. 1 illustrates an example of a radio access network to which the management apparatus and the management method according to an embodiment of the present invention are applied.

The radio access network 1 illustrated in FIG. 1 includes a base station provided with RUs (Radio Units), DUs (Distributed Units), and a CU (Centralized Unit).

In the example in FIG. 1, the DUs are configured (realized), in particular, by virtual machines (VMs: Virtual Machines) using virtualization technology. Thus, in FIG. 1, the DUs are represented as vDUs (virtual Distributed Units) 21, 22. Furthermore, in the example in FIG. 1, in addition to the DUs, the CU is also configured by a VM using virtualization technology. For this reason, the CU in FIG. 1 is represented as a vCU (virtual Centralized Unit) 10.

In FIG. 1, the vDU 21 is configured on the server 20a and the vDU 22 is configured on the server 20b. The vDU 21 and the vDU 22 may be configured by means of virtual machines on different servers or may be configured by means of virtual machines on the same server.

While FIG. 1 illustrates multiple vDUs configured on the server 20a and the server 20b, one or more vDUs, in an arbitrary number, may be configured on the server 20a and the server 20b. Additionally, there may be any number of servers on which vDUs are configured in the radio access network 1.

The RUs are connected to the DUs, and in the example in FIG. 1, the RUs 31, 32, 33 are connected to the vDU 21, and the RUs 44, 45, 46 are connected to the vDU 22. However, any number of RUs may be connected to the vDU 21 and the vDU 22. Additionally, in FIG. 1, the RU connection conditions are omitted for vDUs other than the vDU 21 and the vDU 22. Thus, the radio access network 1 may have RUs connected to the vDUs other than the RUs 31, 32, 33, 44, 45, 46 that are illustrated in FIG. 1.

In FIG. 1, the RUs 31, 32, 33 respectively form the sectors 51, 52, 53, and the RUs 44, 45, 46 respectively form the sectors 64, 65, 66. The sectors 51, 52, 53, 64, 65, 66 respectively contain UE groups 71, 72, 73, 84, 85, 86 comprising one or more user terminals (UEs). The user terminals communicate via the RUs, the vDUs, and the vCU.

Furthermore, the loads placed on the RUs by communication by the UEs in the sectors in the radio access network to which the management apparatus and the management method according to the embodiment are applied will be explained with reference to FIG. 2. Each RU connects to a vDU to form a base station together with the vCU. Thus, the load placed on each RU is reflected in the amount of resources (radio resources such as frequency bands and transmission power and/or physical resources such as memory) in the vDU allocated to each RU.

Figure 2:
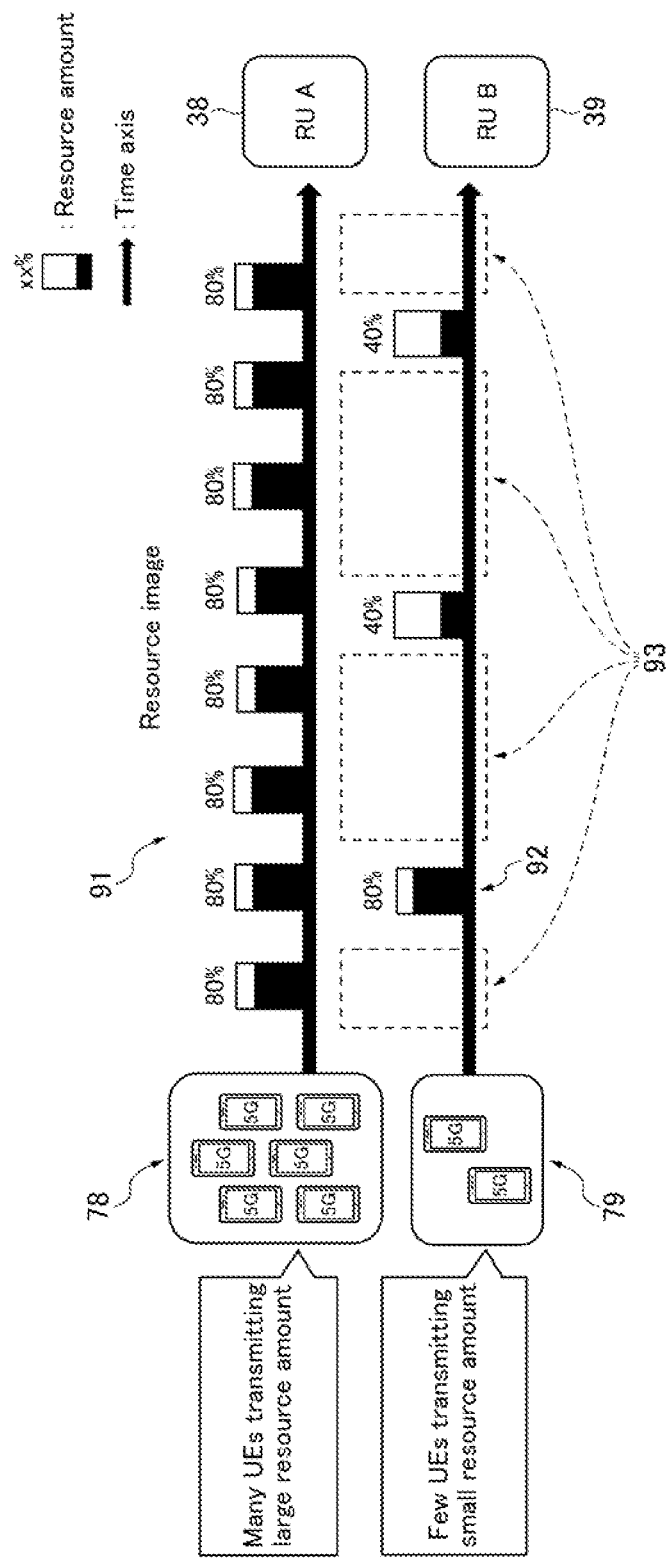
FIG. 2 is a diagram illustrating an example of the loads on RUs in a radio access network according to the embodiment.

In FIG. 2, as RUs, the RU A 38 and the RU B 39 respectively form the sectors 78, 79. In the example in FIG. 2, six UEs are illustrated in the sector 78 and two UEs are illustrated in the sector 79. Furthermore, the multiple blocks on the arrow from the sector 78 to the RU A 38 (resource image) in FIG. 2 indicate that more UEs are transmitting using greater resources, and the multiple blocks on the arrow from the sector 79 to the RU B 39 (resource image) in FIG. 2 indicate that fewer UEs are transmitting using less resources. The "resources" are resources in the RUs used by the UEs and may be radio resources (such as frequency bands and transmission power) or may be physical resources (such as memory).

The "resource images" in FIG. 2 represent the change over time in resource amounts along the time axis, the resource amounts indicating, as percentages, the fraction of resources being used by UEs relative to the resources available in each RU. The resource images 91, 92 indicate the change over time in the resource amounts, respectively, in the RU A 38 and the RU B 39.

In the example in FIG. 2, in the resource image 91, the resource amount in the RU A 38 is 80% throughout the entire time, indicating that large amounts of resources are always necessary. In contrast therewith, in the resource image 92, the resource amount in the RU B 39 changes from 80% to 40% and 40%. Furthermore, in the period 93, no resources are consumed. In other words, in the RU B 39, large amounts of resources are not always necessary.

As mentioned above, each RU connects to a vDU to form a base station together with the vCU. Thus, the resources used in each RU are reflected in the amount of resources (radio resources such as frequency bands and transmission power and/or physical resources such as memory) in the vDU allocated to each RU. Thus, imbalances in the resources used between RUs lead to imbalances in the allocation of the resources in the vDUs. Therefore, efficient resource usage taking advantage of the differences in communication demand between base stations among multiple base stations is sought.

Figure 3:
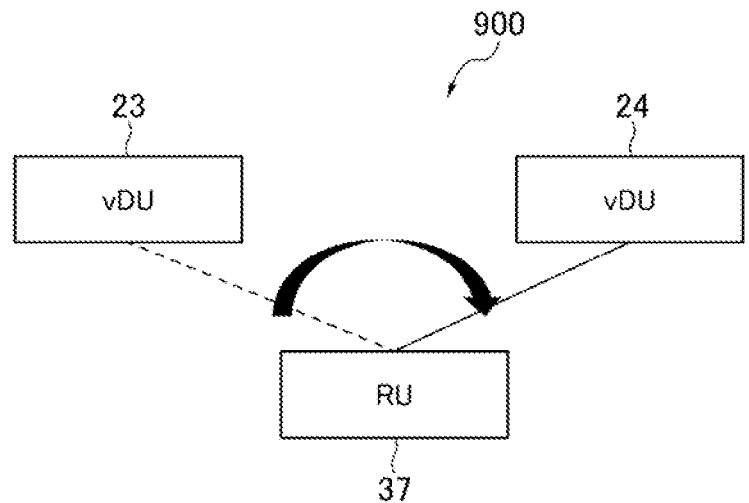
FIG. 3 is a schematic diagram illustrating the connection destination of an RU that is to be switched changing from a switching source vDU to a switching destination vDU.

In order to ensure efficient resource usage, in the present embodiment, as illustrated in FIG. 3, the connection destination of an RU 37 that is to be switched is changed from a switching source vDU 23 to a switching destination vDU 24 (reference number 900 in FIG. 3). In order to perform the switch, a management apparatus for controlling the switch is connected to the vCU and/or the vDUs (see FIG. 5 for the network configuration including the management apparatus).

Figure 4:
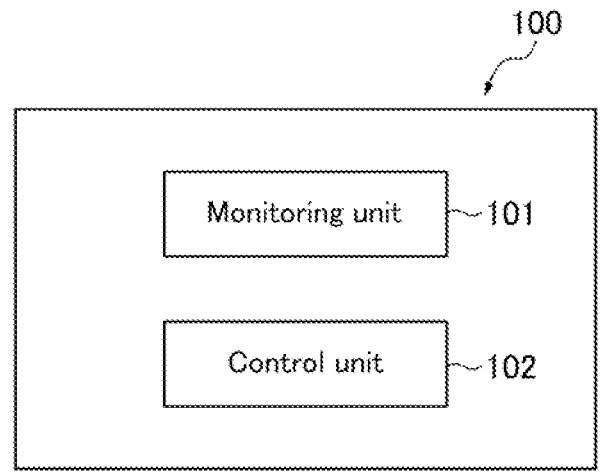
FIG. 4 is a schematic diagram illustrating an example of a management apparatus.

FIG. 4 is a schematic diagram illustrating an example of the management apparatus 100 according to an embodiment. A person skilled in the art would understand that the management apparatus 100 could include components and the like that are omitted from FIG. 4. The management apparatus 100 may be an edge controller located on the regional data center side.

The management apparatus 100 includes a monitoring unit 101 for monitoring base stations in the radio access network, and a control unit 102 for controlling the configuration of the base stations in the radio access network. The monitoring unit 101 can instruct base stations to transmit the load states or the like of allocated resources to the management apparatus 100 and can receive the load states or the like from the base stations. The monitoring unit 101 can supply the received load states or the like of the base stations to the control unit 102, and the control unit 102, in order to receive the load states or the like supplied from the monitoring unit 101, can instruct the monitoring unit 101 to accept the load states or the like of the base stations. Additionally, the control unit 102 can instruct the base stations to change their configurations.

The operations of the management apparatus 100 according to the embodiment will be explained with reference to FIG. 5. Features indicated by reference numbers that are common to FIG. 1 are the same as those in FIG. 1 and the descriptions therefore will not be repeated. Additionally, the vDUs constructed on the servers 20a, 20b in FIG. 1 are omitted with the exception of one each in FIG. 5. Note that there are no particular limitations on the numbers, respectively, of the servers, the vDUs, the RUs, and the UEs.

Additionally, the vDUs 21, 22 may be respectively referred to as the vDU #1 and the vDU #2, the RUs 31, 32, 33 may be respectively referred to as the RU #1, the RU #2, and the RU #3, and the RUs 44, 45, 46 may be respectively referred to as the RU #4, the RU #5, and the RU #6.

Furthermore, the servers 20a, 20b are assumed to be in the same subscriber exchange station 500. The subscriber exchange station is an exchange station collecting all of the lines from subscriber telephones in an area.

In other words, the vDU 21 and the vDU 22 are constructed within the same subscriber exchange station 500. The subscriber exchange station 500 may include the vCU 11, or the vCU 11 may be external to the subscriber exchange station 500, such as being on the regional data center side.

The management apparatus 100 acquires the states of the base stations via the monitoring unit 101 thereof. The management apparatus 100 may acquire the states of the base stations by means of a syslog or by polling. The management apparatus 100 may acquire the load states of the respective vDUs through the vCU 11 (reference number 910 in FIG. 5). The management apparatus may acquire the load states of the respective vDUs directly therefrom (reference number 915 in FIG. 5).

In this case, the "load states of the vDUs" may be represented by the fraction of resources that have been allocated relative to all resources in those vDUs or may be represented by the amounts of resources that have been allocated to those vDUs. Furthermore, the "resources" may be radio resources (such as frequency bands and transmission power) or may be physical resources (such as memory for operating the vDUs, the vCU, and the like).

The acquisition of the load states of the respective vDUs through the vCU 11 (reference number 910 in FIG. 5) by the management apparatus 100 may involve the vCU 11 periodically acquiring the load states of the respective vDUs, and the management apparatus 100 periodically acquiring the load states of the respective vDUs from the vCU 11. In this case, the vCU 11 may acquire the load states of the respective vDUs in parallel.

The direct acquisition of the load states from the respective vDUs by the management apparatus 100 (reference number 915 in FIG. 5) may involve the management apparatus 100 periodically acquiring the load states from the respective vDUs.

The management apparatus 100 may select a first vDU 21 that is to be a switching source based on the load states of the respective vDUs that have been acquired via the control unit 102. For example, the vDU with the highest load state may be selected as the first vDU 21 that is to be the switching source. The first vDU 21 may be assumed to be the vDU in which the load state is the most strained. When it is determined that load leveling with other vDUs is necessary because the load state of the first vDU 21 exceeds a predetermined threshold value, the management apparatus 100 may perform the switching-related operations indicated below. If the load state of the first vDU 21 does not exceed the threshold value, then the management apparatus 100 may resume acquiring the load states of the respective vDUs.

Additionally, the management apparatus 100 may select a second vDU 22 that is to be a switching destination based on the load states of the respective vDUs that have been acquired via the control unit 102. For example, the vDU 22 with the lowest load state on a different server 20b located in the same subscriber exchange station 500 as the server 20a of the first vDU 21 may be selected as the second vDU 22 that is to be the switching destination.

The vDU with the least allocated resources may be assumed to be the vDU with the most available space in terms of resource conditions among the vDUs on different servers located in the same subscriber exchange station as the server of the switching source vDU. However, note that the selection procedure for the second vDU 22 that is to be the switching destination is not limited to such an example. Examples of other procedures for selecting the second vDU 22 that is to be the switching destination will be mentioned below.

The management apparatus 100 acquires the load conditions in the respective RUs (the RU #1 to the RU #3) connected to the first vDU 21 via the monitoring unit 101. The loads on the RUs in this case can be considered to be the loads placed on the resources of the vDU 21 by user terminals through the RUs. Additionally, the "loads on the resources" may be loads generated by a certain RU on the radio resources (such as frequency bands and transmission power) in the vDU or may be loads on physical resources (such as memory for operating the vDUs, the vCU, and the like). Additionally, various methods may also be used as the load computation method. For example, the load may be represented by the fraction of the load from a certain RU relative to all resources in that vDU or may be represented by the amount of the load placed on the vDU by a certain RU.

Figure 5:
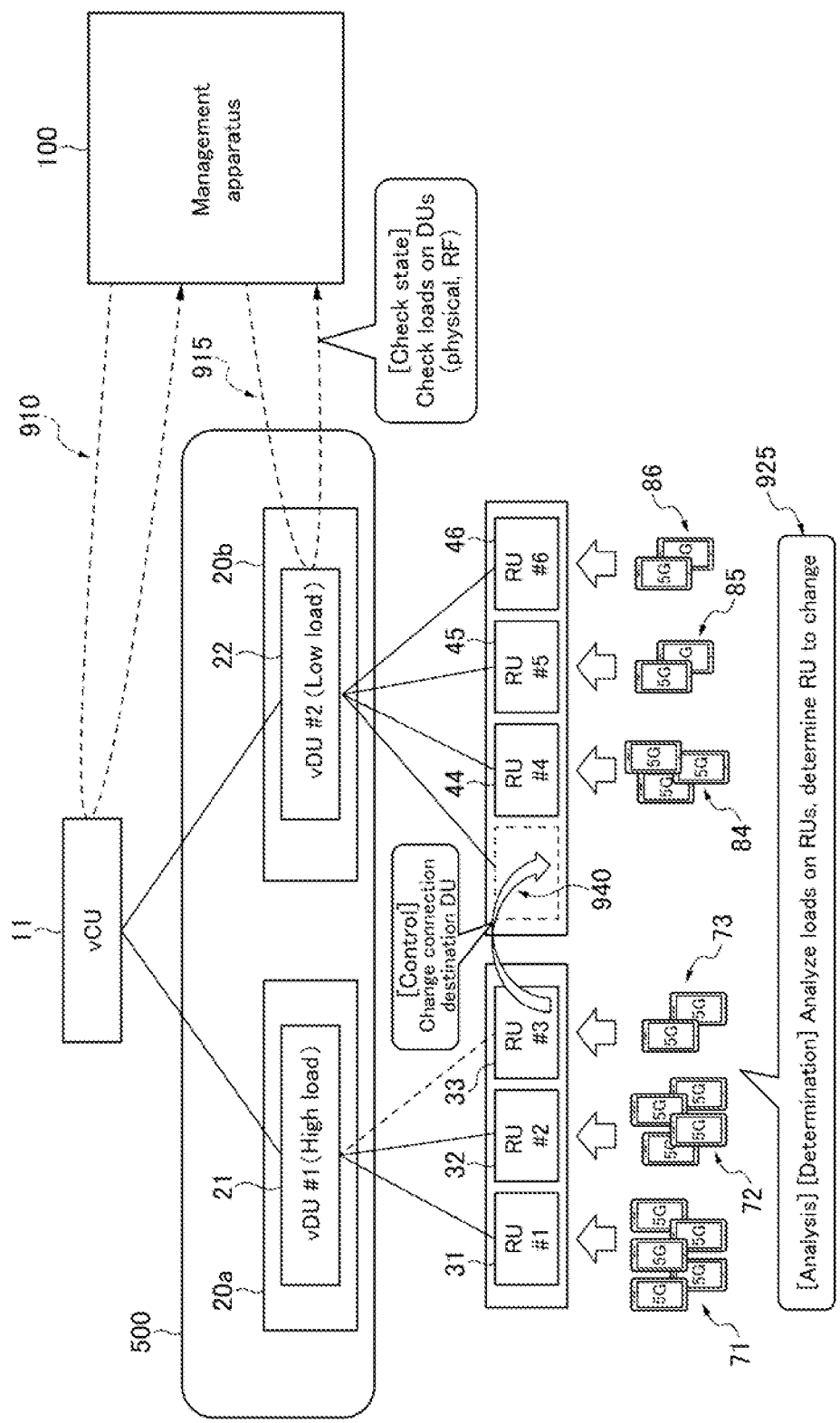
FIG. 5 is a schematic diagram for explaining an example of operation of the management apparatus.

The management apparatus 100 analyzes the load conditions acquired for the respective RUs connected to the first vDU 21 via the control unit 102 and selects an RU for which the connection destination is to be switched from the first vDU 21 to the second vDU 22 (reference number 925 in FIG. 5).

One example 1400A of a procedure for selecting an RU for which the connection destination is to be switched from the first vDU 21 to the second vDU 22 will be explained with reference to FIG. 6.

Figure 6:
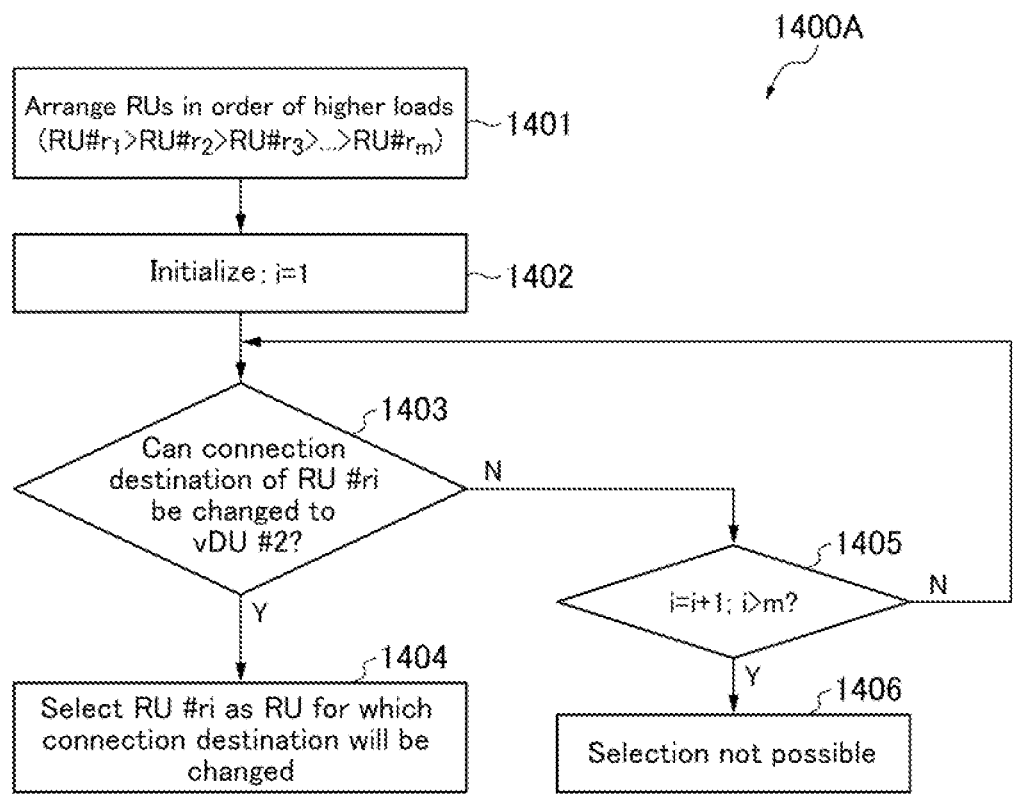
FIG. 6 is a flow chart illustrating an example of the operation/procedure for selecting an RU for which the connection destination vDU is to be switched.

The selection of the RU for which the connection destination is to be switched by the procedure 1400A illustrated in FIG. 6 may be incorporated into the control unit 102 in the management apparatus 100.

Additionally, the procedure 1400A may be applied at the time of starting, when resources are strained.

First, the respective RUs connected to the first vDU 21 are rearranged in the order of higher loads (reference number 1401 in FIG. 6). For example, suppose that the RUs connected to the first vDU 21 are RU #1 to RU #m, where m is an integer greater than or equal to 1. These are rearranged in the order of higher loads (RU #$r_1$, RU #$r_2$, RU #$r_3$, ..., RU #$r_m$). In other words, ($r_1$, $r_2$, $r_3$, ..., $r_m$) are 1 to m rearranged.

Next, the indices i are initialized to 1 (reference number 1402 in FIG. 6) in order to investigate the possibility of changing the connection destination of RU #$r_1$, which is the first among (RU #$r_1$, RU #$r_2$, RU #$r_3$, ..., RU #$r_m$).

A check is performed regarding whether or not the connection destination of RU #$r_i$ (in this case, i=1 due to the above-mentioned initialization), i.e., the RU with the highest load, can be changed from the first vDU 21 to the second vDU 22 (reference number 1403 in FIG. 6).

This check may, for example, be based at least on whether or not the load of that RU can be added to the resources already allocated to the second vDU 22.

In order to facilitate understanding, for example, a detailed analysis of the load will be performed based on physical resources (computational resources). In order to simplify the explanation, it will be assumed that the processors in the server 20a containing the first vDU 21 and the server 20b containing the second vDU 22 are identical, and in particular, that they have the same number of cores.

An example in which the load conditions in the RU for which the connection destination is to be changed are conditions such that ten cores are used in the server 20a containing the vDU 21 will be considered. If the upper limit of the computational resources (processors available in the server 20b) that can be further allocated to the second vDU 22 is eleven cores in the server 20b containing the second vDU 22, then it would be determined that the connection destination of the RU using ten cores in the server 20a may be changed to the second vDU 22. Conversely, if the upper limit of computational resources that the server 20b can further allocate to the second vDU 22 is nine cores, then it would be determined that the connection destination of the RU using ten cores in the server may not be changed to the second vDU 22.

Furthermore, if this change is possible (Y in reference number 1403 in FIG. 6), then the RU #$r_i$ (where i=1 in this case) with the highest load is selected as the RU for which the connection destination is to be changed (1404).

If it is determined that the connection of RU #$r_i$ cannot be changed from the first vDU 21 to the second vDU 22 (N in reference number 1403 in FIG. 6), then i is incremented by 1 (reference number 1405 in FIG. 6). In this case, if the index i exceeds m, which is the number of RUs connected to the first vDU 21 (Y in reference number 1405 in FIG. 6), then an RU for which the connection destination is to be switched from the first vDU 21 to the second vDU 22 cannot be selected by this procedure (reference number 1406 in FIG. 6).

Returning to the explanation of RU #$r_i$ (where i=2 because the index i was incremented by 1), i.e., the RU with the second highest load, a check is performed regarding whether or not the connection destination of RU #$r_2$ can be changed from the first vDU 21 to the second vDU 22 (reference number 1403 in FIG. 6).

If this change is possible (Y in reference number 1403 in FIG. 6), then the RU #$r_i$ (where i=2 in this case) with the second highest load is selected as the RU for which the connection destination is to be changed (reference number 1404 in FIG. 6). Conversely, if it is found that a change from the first vDU 21 to the second vDU 22 is not possible (N in reference number 1403 in FIG. 6), then the index i is incremented by 1 (reference number 1405 in FIG. 6) in order to investigate the RU with the third highest load.

By successively incrementing the index i by 1 in this way, a check is performed regarding whether or not the connection destination can be changed from the first vDU 21 to the second vDU 22 (reference number 1403 in FIG. 6).

That is, according to the procedure illustrated in FIG. 6, a check is performed, in the order of higher loads, regarding whether the connection destination of the respective RUs connected to the first vDU 21 can be changed to the second vDU 22, thereby selecting the RU with the highest load among the RUs that can be changed as the RU for which the connection destination is to be switched.

As a result thereof, as long as it is not confirmed that the connection destination cannot be changed for all of the RUs connected to the first vDU 21, one RU for which the connection destination can be switched from the first vDU 21 to the second vDU 22 can be selected.

For example, in FIG. 5, the RU #3 (RU 33) is selected as an RU for which the connection destination can be switched from the first vDU 21 to the second vDU 22.

Regarding the RU selected as the RU for which the connection destination is to be switched from the first vDU 21 to the second vDU 22, the management apparatus 100 switches the connection destination from the first vDU 21 to the second vDU 22 by means of the control unit 102 (reference number 940 in FIG. 5).

As a result thereof, the load of the RU is transferred from the first vDU 21 to the second vDU 22, thereby allowing the load state of the first vDU 21 to be lightened.

In the example in FIG. 5, the connection destination of the RU #3 (RU 33) is changed from the first vDU 21 to the second vDU 22.

The procedure 1400A for selecting the RU for which the connection destination is to be switched from the first vDU 21 to the second vDU 22 may be applied repeatedly.

Furthermore, for the multiple RUs connected to the first vDU 21, multiple RUs for which the connection destinations have been confirmed to be able to be switched from the first vDU 21 to the second vDU 22 may be selected as RUs for which the connection destinations are to be changed.

Additionally, RUs for which the connection destinations have been confirmed to be able to be switched from the first vDU 21 to the second vDU 22 and RUs for which the connection destinations have been confirmed to be able to be switched in the opposite direction from the second vDU 22 to the first vDU 21 may be selected as one or more RUs for which the connection destinations are to be exchanged, and the connection destinations thereof may be exchanged between the first vDU 21 and the second vDU 22.

Furthermore, even after a procedure for changing the connection destination of an RU has been started due to the first vDU 21 having been assessed to be under strained conditions, the management apparatus may return to acquisition of the load states of the respective vDUs if the strained conditions are relieved before the base stations are reconfigured.

For example, in FIG. 2, the resource amount used by the RU B 39 is initially relatively high, at 80%. Thus, the load state of the vDU to which the RU B 39 is connected may be assessed to be strained, and a connection destination change procedure may be started. However, the state in which the resource amount used by the RU B 39 is 80% is only temporary, and the amount eventually decreases. Thus, if the management apparatus 100 has assessed that the strained conditions in the vDU have been relieved, then the connection destination change procedure may be canceled and the procedure may return to that of acquiring the load states of the respective vDUs.

More detailed operations of the management apparatus 100 according to the embodiment will be explained with reference to FIG. 7.

Figure 7:
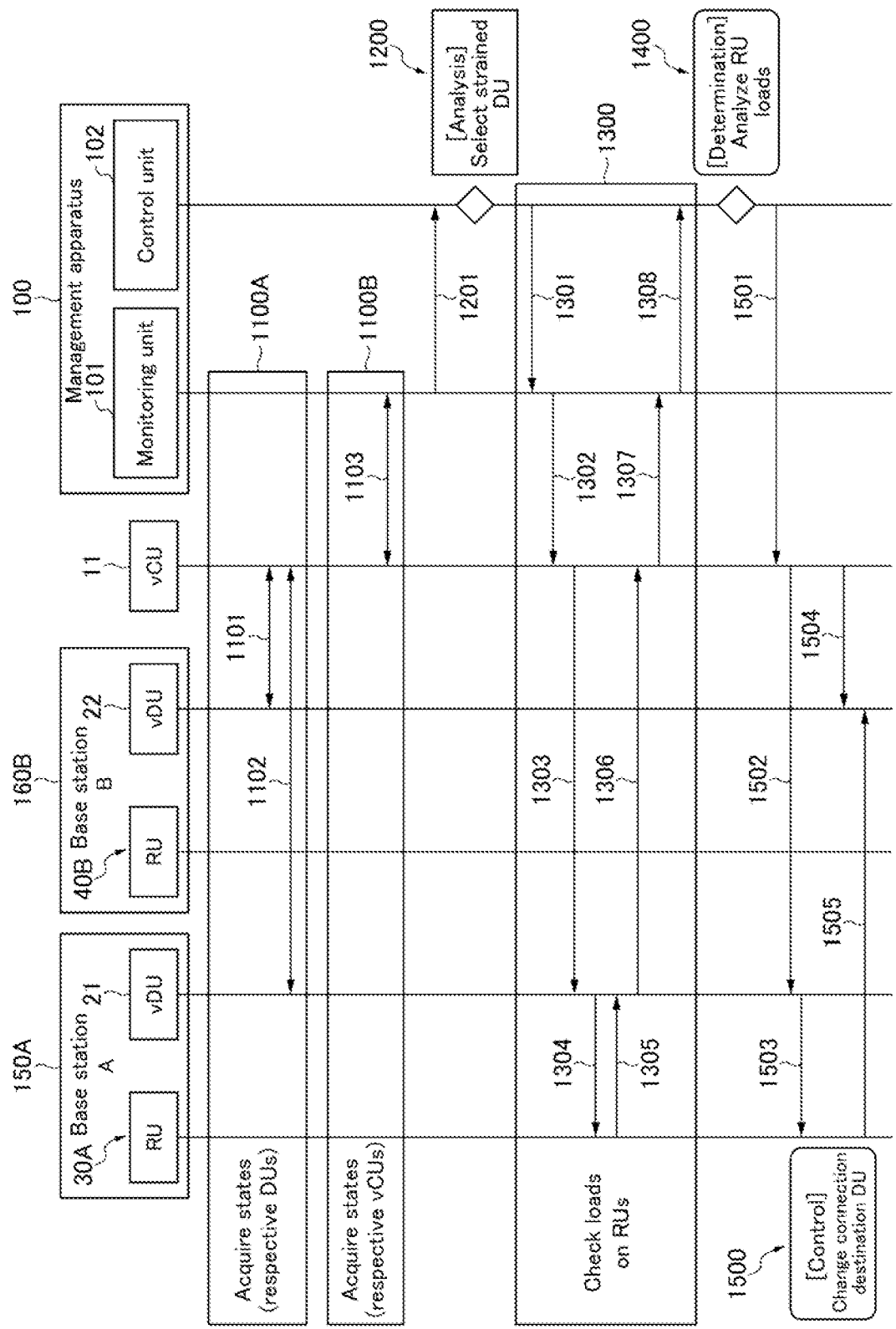
FIG. 7 is a schematic diagram for explaining an example of more detailed operation of the management apparatus.

In FIG. 7, the vCU 11 acquires the load states from the respective vDUs (reference numbers 1101, 1102 in FIG. 7), and the monitoring unit 101 in the management apparatus 100 acquires the load states of the respective vDUs from the vCU 11 (reference number 1103 in FIG. 7).

The monitoring unit 101 supplies the load states of the respective vDUs that have been acquired to the control unit 102 in the management apparatus 100 (reference number 1201 in FIG. 7).

The control unit 102 analyzes the load states of the respective vDUs that have been acquired and selects, as the first vDU 21 that is to be the switching source, a vDU in which the load state is strained (reference number 1200 in FIG. 7). In particular, the vDU with the highest load state is selected as the first vDU 21.

Additionally, the control unit 102 may select, as the second vDU 22 that is to be the switching destination, the vDU with the lowest load state among the vDUs on servers located in the same subscriber exchange station 500 as the server 20a of the first vDU 21 and on a different server 20b from the server 20a.

The control unit 102 notifies the monitoring unit 101 of the selection of the first vDU 21 (reference number 1301 in FIG. 7). The monitoring unit 101 notifies the vCU 11 of the selection of the first vDU 21 for which the notification was provided (reference number 1302 in FIG. 7). The control unit 102 may notify the vCU 11 of the selection of the first vDU 21.

The vCU 11 that has received the notification instructs the first vDU 21 to acquire the load conditions for the respective RUs connected thereto (reference number 1303 in FIG. 7). The instructed first vDU 21 instructs the respective RUs connected thereto to supply the load conditions (reference number 1304 in FIG. 7). The respective RUs that have been instructed supply the load states to the first vDU 21 (reference number 1305 in FIG. 7). The first vDU 21 supplies, to the vCU 11, the load conditions of the respective RUs that have been supplied (reference number 1306 in FIG. 7).

The vCU 11 supplies, to the monitoring unit 101, the load conditions of the respective RUs connected to the first vDU 21 that have been supplied (reference number 1307 in FIG. 7). The monitoring unit 101 supplies, to the control unit 102, the load conditions of the respective RUs connected to the first vDU 21 that have been supplied (reference number 1308 in FIG. 7). The vCU 11 may supply the control unit 102 with the load conditions of the respective RUs connected to the first vDU 21 that have been supplied.

In this way, the load conditions of the respective RUs connected to the first vDU 21 can be collected in the control unit 102.

The control unit 102 analyzes the load conditions of the respective RUs connected to the first vDU 21 and selects an RU 30A for which the connection destination is to be switched from the first vDU 21 to the second vDU 22 (reference number 1400 in FIG. 7). At this time, the selection is made such that switching the connection destination of the RU 30A from the first vDU 21 to the second vDU 22 is possible in view of the load states of that RU 30A and the second vDU 22.

The control unit 102 supplies the respective addresses of the first vDU 21, the second vDU 22, and the selected RU 30A to the vCU 11 (reference number 1501 in FIG. 7). In the case in which the vCU 11 holds address information for the first vDU 21, there is no need to re-supply the vCU 11 with the address of the first vDU 21.

The vCU 11 instructs the first vDU 21 to terminate the connection with the selected RU 30A (reference number 1502 in FIG. 7). The first vDU 21 that has been instructed terminates the connection with the selected RU 30A (reference number 1503 in FIG. 7).

Additionally, the vCU 11 instructs the second vDU 22 to add the address of the selected RU 30A (reference number 1504 in FIG. 7). The second vDU 22 that has been instructed and the selected RU 30A are connected (reference 1505 in FIG. 7). As a result thereof, the RU 30A becomes linked to the second vDU 22 and the monitoring of the state of the RU 30A is transferred to the second vDU 22.

An example of different operations of the management apparatus according to an embodiment will be explained with reference to FIG. 8. Regarding features indicated by reference numbers that are common to FIG. 1 and FIG. 5, they are the same as those in FIG. 1 and FIG. 5, and the descriptions therefore will not be repeated. Additionally, the servers other than the server 20a are omitted in FIG. 8. Note that there are no particular limitations on the numbers, respectively, of the servers, the vDUs, the RUs, and the UEs.

Figure 8:
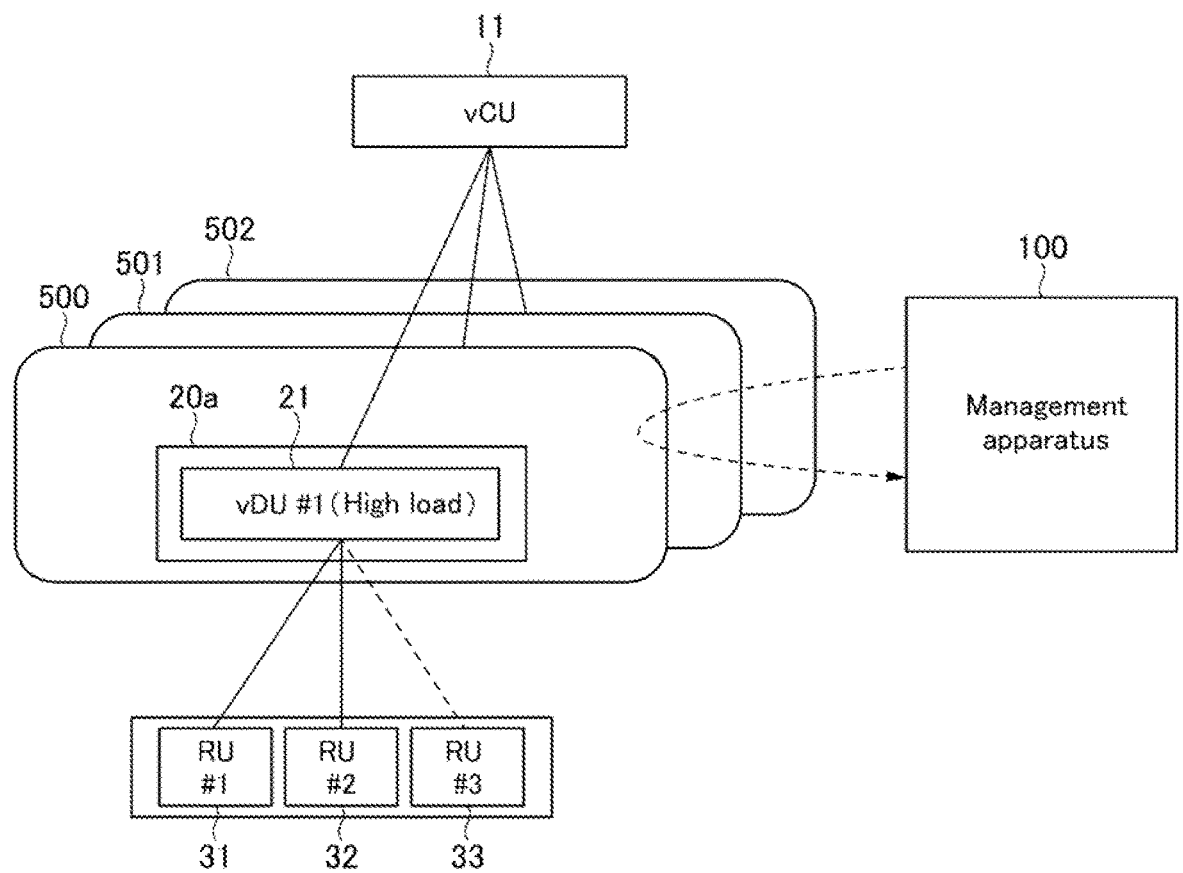
FIG. 8 illustrates another example of a radio access network to which the management apparatus and the management method according to the embodiment are applied.

FIG. 8 includes a subscriber exchange station 501 and a subscriber exchange station 502 in addition to the subscriber exchange station 500 containing the server 20a. In other words, there are a total of three subscriber exchange stations, and these subscriber exchange stations constitute the radio access network. These will be described as GCs #g (g=1 to n). This n is, for example, the number of subscriber exchange stations managed by the management apparatus 100, and in FIG. 8, n=3.

The indices of the subscriber exchange stations may be assigned in any way. The arrangement of the GCs #g will be explained below.

There are one or more servers not only in the GC #1, but also in the GC #2 to the GC #n, and there are vDUs on each server.

The vCU 11 may be located inside one of the GC #1 to the GC #n or may be external to the GC #1 to the GC #n, such as being on the regional data center side.

Regarding the first vDU 21 that is to be the switching source, the management apparatus 100 can, by means of the control unit 102 therein, analyze the load states of the respective vDUs that have been acquired and select the vDU with the highest load state as the first vDU 21 that is to be the switching source. The first vDU 21 may be assumed to be the vDU in which the load state is the most strained.

One example 1400B of the procedure for selecting the RU for which the connection destination is to be switched from the first vDU 21 and the second vDU 22 that is to be the connection destination will be explained with reference to FIG. 9.

Figure 9:
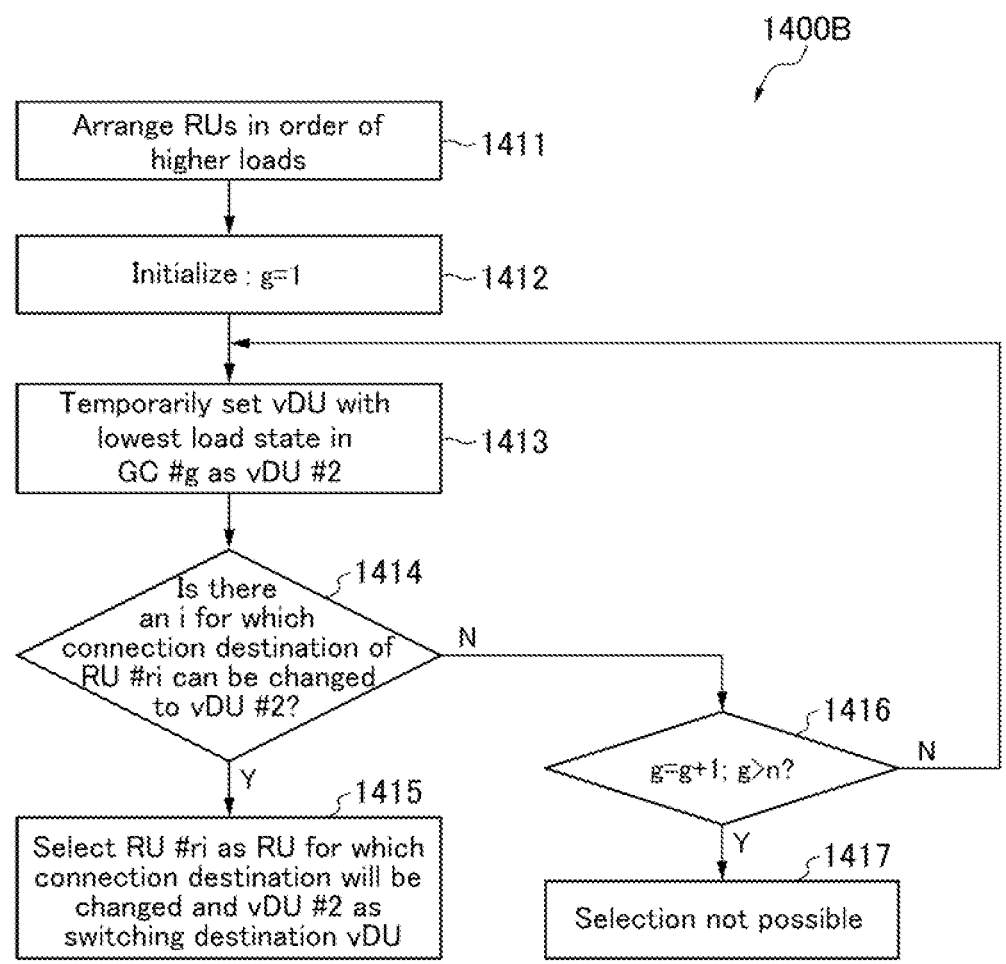
FIG. 9 is a flow chart illustrating another example of the operation/procedure for selecting an RU for which the connection destination vDU is to be switched, and for setting the switching destination vDU.

The selection of the RU for which the connection destination is to be switched and the second vDU 22 that is to be the connection destination by the procedure 1400B illustrated in FIG. 9 may be incorporated into the control unit 102 in the management apparatus 100.

Additionally, the procedure 1400B may be applied at the time of starting, when resources are strained.

First, as explained using FIG. 6, the respective RUs connected to the first vDU 21 are rearranged in the order of higher loads (reference number 1411 in FIG. 9). For example, suppose that the RUs connected to the first vDU 21 are the RU #1 to the RU #m, where m is an integer greater than or equal to 1. These are rearranged in the order of higher loads (RU #$r_1$, RU #$r_2$, RU #$r_3$, . . . , RU #$r_m$). In other words, ($r_1$, $r_2$, $r_3$, . . . , $r_m$) are 1 to m rearranged.

Next, the index g is initialized to 1 in order to select the second vDU 22 that is to be the connection destination in the GC #g (reference number 1412 in FIG. 9).

Furthermore, in the GC #g, the load states of the respective vDUs are acquired from the respective servers. This may involve, for example, as explained in FIG. 5, the management apparatus 100 acquiring the load states of the respective vDUs in the GC #g via the vCU 11 (reference 910 in FIG. 5), or directly acquiring the load states from the respective vDUs in the GC #g (reference number 915 in FIG. 5).

Furthermore, from the load states of the respective vDUs that have been acquired, the vDU with the lowest load state in the GC #g is selected and is temporarily set as the second vDU 22 (reference number 1413 in FIG. 9)

For the subscriber exchange station containing the first vDU 21, the vDU with the lowest load state among the vDUs on a server 20b different from the server 20a of the first vDU 21 may be temporarily set as the second vDU 22 that is to be the switching destination.

In the GC #g, regarding the vDU that has been temporarily set as the second vDU 22, a check is performed, in the order of higher loads, regarding whether the connection destination of the respective RUs connected to the first vDU 21 can be changed to the second vDU 22 (reference number 1414 in FIG. 9). As explained in FIG. 6, this procedure involves checking whether or not the connection destination of the RU #$r_i$, beginning with the index i set to 1, can be changed from the first vDU 21 to the second vDU 22. If the change is possible, then the RU #$r_i$ with the highest load is selected as the RU for which the connection destination is to be changed, and if the change is not possible, then i is incremented by 1.

As a result thereof, the respective RUs connected to the first vDU 21 are checked, in the order of higher loads, regarding whether or not the connection destinations can be changed to the temporarily set second vDU 22, thereby selecting, as the RU for which the connection destination is to be switched, the RU with the highest load among those in which the change is possible.

When the respective RUs that are connected to the first vDU 21 have been investigated in the order of higher loads in this way, and one for which the connection destination can be confirmed to be changeable to the temporarily set second vDU 22 has been identified (Y in reference number 1414 in FIG. 9), that RU #$r_i$ is selected as the RU for which the connection destination is to be changed and the vDU with the lowest load state in the GC #g is set as the second vDU 22 that is to be the switching destination (reference number 1416 in FIG. 9).

Meanwhile, in the case that an RU for which the connection destination is to be switched from the first vDU 21 to the vDU 22 with the lowest load state in the GC #g cannot be selected (N in reference number 1414 in FIG. 9), g is incremented by 1 (reference number 1416 in FIG. 9).

If the index g exceeds the number of subscriber exchange stations (Y in reference number 1416 in FIG. 9), then this procedure cannot be used to select an RU for which the connection destination is to be switched from the first vDU 21 to the second vDU 22, or to set the second vDU that is to be the switching destination (reference number 1417 in FIG. 9).

Furthermore, in the GC #g (g=2) also, as in the case of the GC #g (g=1), when the respective RUs that are connected to the first vDU 21 have been investigated in the order of higher loads, and one for which the connection destination can be confirmed to be changeable to the vDU with the lowest load state in the GC #g has been found (Y in 1414), that RU is selected as the RU for which the connection destination is to be changed and the vDU with the lowest load state in the GC #g is set as the second vDU 22 that is to be the switching destination (reference number 1416 in FIG. 9).

Conversely, in the case that an RU for which the connection destination is to be switched from the first vDU 21 to the vDU with the lowest load state in the GC #g (where g=2) cannot be selected (N in 1414), g is incremented by 1 (reference number 1416 in FIG. 9).

By successively incrementing the index g by 1 in this way, the respective RUs connected to the first vDU 21 are checked, in the order of higher loads, regarding whether the connection destination can be changed to the vDU with the lowest load state in the GC #g (reference numbers 1413, 1414 in FIG. 9).

As a result thereof, the second vDU 22 that is to be the switching destination is determined, and furthermore, the RU for which the connection destination is to be changed is determined from among the RUs connected to the first vDU 21.

The indices of the subscriber exchange stations may be assigned in any way. However, since the connection destination of the RU is switched as soon as a vDU to which the connection destination can be changed is identified in a GC #g (Y in reference number 1414 in FIG. 9), a vDU in a GC #g having a low index g tends to be selected as the switching destination. For this reason, more effective switching can be realized in accordance with the manner in which the indices are assigned to the subscriber exchange stations.

For example, suppose that the subscriber exchange station containing the first vDU 21 that is to be the switching source is the GC #1. The indices g of the GCs #g should be assigned so that the GC #2, the GC #3, . . . are arranged in the order of proximity to the GC #1. This may be based on position information of the respective subscriber exchange stations.

The position information of the respective subscriber exchange stations may, for example, be acquired by the management apparatus by referring to a database or the like in which position information of the respective subscriber exchange stations is stored. Alternatively, for example, the respective subscriber exchange stations may each store position information, and the management apparatus may acquire the position information from the respective subscriber exchange stations.

As a result thereof, the process of selecting the vDU with the lowest load state in a GC #g and temporarily setting that vDU as the second vDU 22 (reference number 1413 in FIG. 9) while incrementing the indices g of the GCs #g occurs from positions closer to the GC #1 containing the first vDU 21 based on at least position information of the multiple subscriber exchange stations.

Furthermore, the procedure for investigating the respective RUs connected to the first vDU 21 in the order of higher loads in order to find one for which the connection destination can be confirmed to be changeable to the second vDU 22 that has been temporarily set as the connection destination is also performed from subscriber exchange stations closer to the GC #1 containing the first vDU 21.

In other words, when selecting the vDU with the lowest load state in a GC #g and temporarily setting that vDU as the second vDU 22 (reference number 1413 in FIG. 9), a switching destination second vDU 22 closer to the switching source first vDU 21 tends to be selected. Thus, the load leveling can be expected to be less affected by delays due to distance.

As another example of assignment of indices to the subscriber exchange stations, first, the subscriber exchange station containing the first vDU that is to be the switching source is defined as the GC #1. Then, for subscriber exchange stations adjacent to the GC #1, the indices g of the GCs #g should be assigned so that the GC #2, the GC #3, . . . are arranged in the order of less used resources. The subscriber exchange stations adjacent to the GC #1 may be identified by using the position information of the respective subscriber exchange stations.

Additionally, an upper limit n of the indices g of the GCs #g for finding the second vDU 22 that is to be the switching destination should be made 1 larger than the number of subscriber exchange stations adjacent to the GC #1. In other words, the subscriber exchange stations adjacent to the GC #1 should be the GC #2 to the GC #n.

As a result thereof, when selecting the vDU with the lowest load state in a GC #g and temporarily setting that vDU as the second vDU 22 (reference number 1413 in FIG. 9), a vDU in a subscriber exchange station adjacent to the subscriber exchange station containing the first vDU 21 and having less used resources is selected as the second vDU 22 that is to be the switching destination. Thus, even more efficient load leveling can be expected to be less affected by delay due to distance.

As yet another example of assignment of indices to the subscriber exchange stations, first, the subscriber exchange station containing the first vDU that is to be the switching source is defined as the GC #1. Then, for subscriber exchange stations in which the delay from the GC #1 is smaller than a threshold value, the indices g of the GCs #g should be assigned so that the GC #2, the GC #3, . . . the GC #n are arranged in the order of less used resources, with the number n of subscriber exchange stations as the upper limit of the indices g.

As a result thereof, even more efficient load leveling can be expected to be achieved with the influence of delay between the subscriber exchange stations being less than a threshold value.

As yet another example of assignment of indices to the subscriber exchange stations, first, the subscriber exchange station containing the first vDU that is to be the switching source is defined as the GC #1. Then, for subscriber exchange stations for which the distance from the GC #1 is smaller than a threshold value, the indices g of the GCs #g should be assigned so that the GC #2, the GC #3, . . . the GC #n are arranged in the order of less used resources, with the number n of subscriber exchange stations as the upper limit of the indices g.

As a result thereof, even more efficient load leveling can be expected to be achieved with the influence of distance between the subscriber exchange stations being less than a threshold value.

Figure 10:
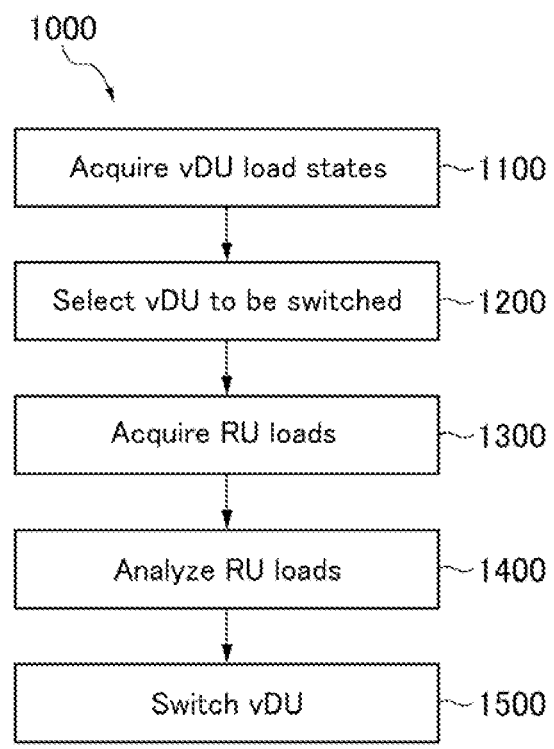
FIG. 10 is a flow chart illustrating an example of a management method.

FIG. 10 is a flow chart illustrating an example of a management method 1000 according to an embodiment.

The management apparatus 100 acquires the load states of the respective vDUs (reference number 1100 in FIG. 10).

The management apparatus 100 analyzes the load states of the respective vDUs that have been acquired and selects a switching source vDU and a switching destination vDU (reference number 1200 in FIG. 10).

In particular, from the load states of the respective vDUs that have been acquired, the vDU with the most allocated resources may be selected as the switching source vDU.

Additionally, from the load states of the respective vDUs that have been acquired, the vDU with the least allocated resources on a different server located in the same subscriber exchange station as the server of the switching source vDU may be selected as the switching destination vDU.

The management apparatus 100 acquires the load conditions of the respective RUs connected to the switching source vDU (reference number 1200 in FIG. 10).

The management apparatus 100 analyzes the acquired load conditions of the respective RUs connected to the switching source vDU (reference number 1400 in FIG. 10). As a result thereof, an RU for which the connection destination is to be switched from the switching source vDU to the switching destination vDU is selected.

This RU may be selected by the procedure 1400A explained using FIG. 6, or if there are multiple subscriber exchange stations, by the procedure 1400B explained using FIG. 9. According to the procedure 1400B explained using FIG. 9, the RU is selected, and also, the switching destination vDU is set.

Regarding the RU selected as the RU for which the connection destination is to be switched from the switching source vDU to the switching destination vDU, the management apparatus 100 switches the connection destination from the switching source vDU to the switching destination vDU (reference number 1500 in FIG. 10).

Furthermore, the present invention also includes a management program for making a management apparatus execute the above-described management method. Said management program may be provided by being recorded on a computer-readable non-transitory storage medium.

As explained above, according to the embodiments of the present invention, by transferring the load of an RU from a switching source vDU to a switching destination vDU, the load state in the switching source vDU can be lightened, thereby leveling the load.

The present invention is not limited to the embodiments described above and includes various modified examples in which constituent elements have been added, removed, or replaced with respect to the configurations indicated above.

The term "connection" used in the present description refers to a logical connection for the purpose of communication. For example, "an RU connected to a vDU" refers to the vDU and the RU being logically connected so as to be able to communicate. There is no need for the vDU and the RU to be directly connected in a necessarily physical manner by means of physical cables or the like, and the vDU and the RU may be connected via multiple devices or by radio communication.

REFERENCE SIGNS LIST

1 Radio access network
11 vCU
20a, 20b Server
21, 22, 23, 24 vDU
30A, 31, 32, 33, 37, 38, 39, 40B, 44, 45, 46 RU
51, 52, 53, 64, 65, 66 Sector
71, 72, 73, 78, 79, 84, 85, 86 UE group
91, 92 Resource
93 Available resource
100 Management apparatus
101 Monitoring unit
102 Control unit
150A, 160B Base station
500, 501, 502 Subscriber exchange station

The invention claimed is:

1. A management apparatus in a radio access network including Radio Units (RUs) and virtual Distributed Units (vDUs), the management apparatus comprising:
a controller configured to:
acquire load states of the vDUs; and
determine, among the vDUs, based on the load states that have been acquired, a first vDU in which a load should be lowered and a second vDU for receiving part of the load from the first vDU, to determine, among RUs connected to the first vDU, an RU for which a connection destination is to be changed to the second vDU, and to change the connection destination of the determined RU from the first vDU to the second vDU.

2. The management apparatus according to claim 1, wherein the load states of the respective vDUs relate to radio resources or to physical resources.

3. The management apparatus according to claim 1, wherein the radio access network further includes a virtual Centralized Unit (vCU) that periodically acquires the load states of the vDUs, and the controller is configured to periodically acquire the load states of the respective vDUs from the vCU.

4. The management apparatus according to claim 1, wherein the controller is configured to periodically acquire the load states from the respective vDUs.

5. The management apparatus according to claim 1, wherein the controller is configured to determine, as the first vDU, the vDU with a highest load state among the vDUs.

6. The management apparatus according to claim 5, wherein the controller is configured to determine, as the RU for which the connection destination is to be changed to the second vDU, the RU with the highest load among the RUs connected to the first vDU and for which the connection destination can be changed to the vDU with a lowest load state among respective subscriber exchange stations in the radio access network.

7. The management apparatus according to claim 6, wherein the vDU with the lowest load state among respective subscriber exchange stations is selected in an order of the respective subscriber exchange stations closer to the subscriber exchange station containing the first vDU based on at least position information of the multiple subscriber exchange stations.

8. The management apparatus according to claim 5, wherein the controller is configured to select the RU with the highest load among the RUs connected to the first vDU and for which the connection destination can be changed to the vDU with the lowest load state among respective subscriber exchange stations in the radio access network, and to determine, as the second vDU, the vDU with the lowest load state that can be a connection destination for the selected RU.

9. The management apparatus according to claim 8, wherein the controller is configured to determine, as the RU for which the connection destination is to be changed to the second vDU, the RU with the highest load among the RUs connected to the first vDU and for which the connection destination can be changed to the vDU with the lowest load state among respective subscriber exchange stations in the radio access network.

10. The management apparatus according to claim 8, wherein the vDU with the lowest load state among respective subscriber exchange stations is selected in an order of the respective subscriber exchange stations closer to the subscriber exchange station containing the first vDU based on at least position information of the multiple subscriber exchange stations.

11. The management apparatus according to claim 8, wherein a determination of whether or not the connection destination of the RU can be changed is based on at least a determination of whether or not the load of the RU can be added to resources already allocated to the vDU that is a change destination.

12. The management apparatus according to claim 1, wherein the controller is configured to determine, as the second vDU, the vDU with the lowest load state among the vDUs on servers different from the first vDU and located in a same subscriber exchange station as the first vDU.

13. The management apparatus according to claim 1, wherein the controller is configured to determine, as the RU for which the connection destination is to be changed to the second vDU, the RU with the highest load among the respective RUs connected to the first vDU and for which the connection destination can be changed to the second vDU.

14. The management apparatus according to claim 13, wherein a determination of whether or not the connection destination of the RU can be changed is based on at least a determination of whether or not the load of the RU can be added to resources already allocated to the vDU that is a change destination.

15. A management method to be performed by a management apparatus in a radio access network including Radio Units (RUs) and virtual Distributed Units (vDUs), wherein the management method comprises:
acquiring load states of the respective vDUs;
determining, among the vDUs, based on the load states that have been acquired, a first vDU in which a load should be lowered and a second vDU for receiving part of the load from the first vDU;

determining, among RUs connected to the first vDU, an RU for which a connection destination is to be changed to the second vDU; and changing the connection destination of the determined RU from the first vDU to the second vDU.

\* \* \* \* \*